J. M. YATES.
DOOR HANDLE FOR AUTOMOBILES AND THE LIKE.
APPLICATION FILED MAY 12, 1920.
1,372,734. Patented Mar. 29, 1921.
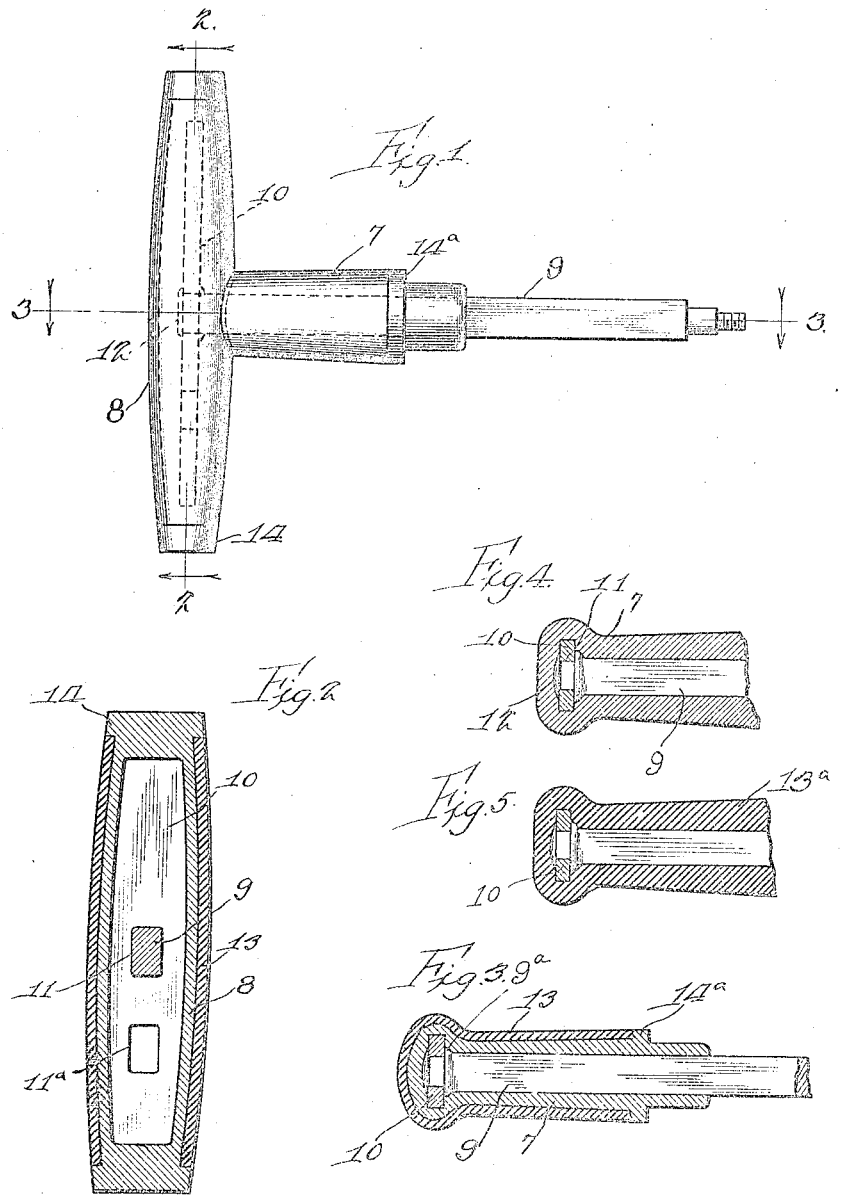

UNITED STATES PATENT OFFICE.

JOSEPH M. YATES, OF CHARLOTTE, MICHIGAN, ASSIGNOR TO HANCOCK MANUFACTURING CO., OF CHARLOTTE, MICHIGAN, A CORPORATION OF MICHIGAN.

DOOR-HANDLE FOR AUTOMOBILES AND THE LIKE.

1,372,734.

Specification of Letters Patent. Patented Mar. 29, 1921.

Application filed May 12, 1920. Serial No. 380,712.

*To all whom it may concern:*

Be it known that I, JOSEPH M. YATES, a citizen of the United States, residing at Charlotte, in the county of Eaton and State of Michigan, have invented certain new and useful Improvements in Door-Handles for Automobiles and the like, of which the following is a specification.

The invention relates to handles such as are employed upon the doors of automobiles, and the aim of the invention is to provide an improved construction for such handles.

More specifically the object of the invention is to provide a handle of the character indicated which is of very simple construction so that it may be cheaply manufactured, and which is of a strong and rugged character.

The object of the invention thus generally stated, together with other and ancillary advantages, is attained by the construction and arrangement illustrated in the accompanying drawings forming part hereof, in which Figure 1 is a side elevation of a handle constructed in accordance with my invention. Fig. 2 is a sectional view taken on an enlarged scale in the plane on line 2—2 of Fig. 1. Fig. 3 is a transverse sectional view taken in the plane of line 3—3 of Fig. 1. Figs. 4 and 5 are views similar to Fig. 3 but showing slightly different forms of construction.

Referring to Fig. 1 of the drawings, the handle comprises a stem 7 and a cross-piece 8. The stem carries a shank 9 which is made square so as to be capable of operating a door lock in the usual way, and one end extends longitudinally through the stem 7 and terminates in a reinforcing or anchoring member 10 extending longitudinally of the cross-piece 8. The connection between the shank 9 and the anchoring member 10 is accomplished by shaping the end of the shank to provide a squared end portion with a shoulder 9ª, the end portion being inserted through a rectangular opening 11 in the anchoring member 10 and then headed as shown at 12.

The stem 7 and cross-piece 8 are preferably made of a relatively soft material such as brass, and may, if desired be provided with a covering 13 of hard rubber or the like. In this latter event the stem and cross-piece are cut away between their ends, providing end caps 14 and 14ª flush with the outer surface of the rubber covering 13. As shown in Fig. 4, the rubber covering may be omitted if desired, and as shown in Fig. 5, the shank 9 and anchoring member 10 may be covered directly with a rubber covering 13ª.

In the operation of forming the handle, the shank 9 and member 10 are first secured together as above described, and then placed in a steel mold and a die casting of brass or other metal is formed around the member 10 and the adjacent portion of the shank 9 to form the cross-piece 8 and the stem 7. The cast portion is then machined and if desired the rubber covering 13 is finally provided. If it should be desired to omit the brass casting and employ the rubber covering only, the latter is made of increased thickness as at 13ª.

It will be apparent that by the construction set forth, the strain upon the shank 9, in the use of the handle, is borne directly by the anchoring member 10 of the cross-piece. Thus, a very strong and durable handle is provided as compared with the construction which has heretofore been employed, in which the shank 9 terminates in the stem portion 7 of the handle with the result that when the handle is subjected to severe strains, the soft metal of the handle is incapable of securely holding the shank against movement relative thereto. Moreover, by the use of my improved construction, it is even possible to substitute for the brass body a covering 13ª of rubber or other relatively soft material.

In practice, the member 10 is provided with an aperture 11ª near one end thereof in which the shank may be secured if desired instead of in the aperture 11, as when it is desired to provide an L-shaped handle.

I claim as my invention:

1. A door handle comprising a stem, an operating shank extending through said stem, a cross-piece formed on the stem, and an anchoring member extending longitudinally of said cross-piece and rigidly secured to the shank.

2. A door handle comprising a stem and a cross-piece formed of relatively soft metal such as brass, a latch operating shank carried by said stem and having a portion extending longitudinally therethrough and into the cross-piece, and a reinforcing member embedded in the cross-piece and having said shank rigidly secured thereto.

3. A door handle comprising an operating shank, a member rigidly secured at one end of the shank, and a covering of relatively soft material for a portion of the shank and said member, said covering providing a stem and a cross-piece on the stem.

4. A handle for automobile door latches comprising in combination with a latch-operating shank of steel or the like, a bar of substantial length also of steel secured upon the outer end of the shank transversely thereof, and a covering for said bar and the portion of the shank adjacent the bar formed of relatively soft material and shaped so as to be capable of being conveniently gripped by the hand.

5. A handle for automobile door latches comprising, in combination with a latch-operating shank of hardened metal, a bar of substantial length also of hardened metal secured upon the outer end of the shank transversely thereof, and a covering for said bar and the portion of the shank adjacent the bar, said covering being of soft metal cast around the cross bar and the adjacent portion of the shank.

In testimony whereof, I have hereunto set my hand.

JOSEPH M. YATES.